United States Patent [19]
Fried et al.

[11] Patent Number: 5,116,174
[45] Date of Patent: May 26, 1992

[54] METHOD AND APPARATUS FOR MANUFACTURING JEWELRY, AND AN ARTICLE OF JEWELRY MADE THEREBY

[76] Inventors: Kenneth Fried, 25 Thornwood La., East Hills, N.Y. 11577; Herman Herskovic, 24-39 E. 71st St., Brooklyn, N.Y. 11234

[21] Appl. No.: 435,243

[22] Filed: Nov. 13, 1989

[51] Int. Cl.$^5$ .................. B23C 1/06; B23Q 15/007
[52] U.S. Cl. ........................... 409/79; 269/21; 364/474.02; 364/474.22; 409/117
[58] Field of Search ............ 409/85, 93, 94, 109, 409/80, 96, 107, 116, 117, 131, 132, 190, 191, 189, 202, 204, 212, 126, 79; 269/21; 364/474.02, 474.22, 474.28

[56] References Cited

U.S. PATENT DOCUMENTS

| | | | |
|---|---|---|---|
| 3,259,022 | 7/1966 | Vietorisz | 409/96 |
| 4,005,635 | 2/1977 | Feldcamp | 409/132 |
| 4,437,150 | 3/1984 | Fahlgren, Jr. et al. | 364/474.22 |
| 4,480,364 | 11/1984 | Kosmowski | 408/87 |
| 4,639,172 | 1/1987 | Kiohi et al. | 409/80 |
| 4,808,046 | 2/1989 | Pilkington et al. | 408/87 |

FOREIGN PATENT DOCUMENTS

| | | | |
|---|---|---|---|
| 1013489 | 8/1957 | Fed. Rep. of Germany | 409/94 |
| 43-15026 | 5/1968 | Japan | 409/85 |
| 56811 | 4/1985 | Japan | 409/79 |
| 191746 | 9/1985 | Japan | 409/79 |
| 76256 | 4/1986 | Japan | 409/79 |
| 650784 | 3/1979 | U.S.S.R. | 409/93 |

*Primary Examiner*—Daniel W. Howell
*Attorney, Agent, or Firm*—Fitzpatrick, Cella, Harper & Scinto

[57] ABSTRACT

A method and apparatus for manufacturing jewelry, and an article of jewelry made thereby. According to the method, a pattern is provided for the article in a form suitable for controlling a mechanical table, the workpiece is mounted on the mechanical table through the intermediary of a backing, the pattern is transferred to the workpiece, and the workpiece is removed from both the mechanical table and the backing.

The apparatus includes a machine table having a work surface and a machine head actable on the work surface, the machine head being movable in accordance with an input signal, a mount for accepting the workpiece, the mount being mountable on the work surface, and a processor for producing the input signals in accordance with a desired sequence of movements.

20 Claims, 9 Drawing Sheets

METHOD AND APPARATUS FOR MANUFACTURING JEWELRY, AND AN ARTICLE OF JEWELRY MADE THEREBY

BACKGROUND OF THE INVENTION

1. Field of the Invention

The present invention pertains to a method and apparatus for manufacturing jewelry, and an article of jewelry made thereby. More particularly, the method and apparatus are directed to the use of an XYZ mechanical table operating under computer control to cut the article of jewelry from a metal workpiece.

2. Description of the Related Art

FIGS. 1A and 1B depict the front and back, respectively, of a generalized article of jewelry having features that typify most articles of jewelry. In the usual case, the article of jewelry is made of metal such as gold, although it will be appreciated that other material such as coated plastic may be used.

The article of jewelry is in the form of a pendant having an outline shape 11, and two openings 12. Together the outline and the openings comprise cutout areas, that is areas that define the perimeter of the pendant, whether the perimeter is an internal or an external edge of the pendant.

The pendant also has a design area 14. Unlike the cutout areas, the design area is a surface feature of the pendant and completes the overall appearance of the pendant by forming a design or pattern on the surface thereof. Design areas are not cut completely through the pendant. Design areas are needed to define various features within the pendant (for example, the top and bottom of the "O" in "MOM"), while preventing these features from separating from the pendant. Thus, design areas do not pass completely through the pendant, and, as shown in FIG. 1B, are not visible from the back of the pendant.

In general, three techniques are known for manufacturing such an article of jewelry: etching, stamping, and casting. Each of these techniques is useful in a particular situation, and each has certain drawbacks. Each method, and its applicability and drawbacks, will be described below.

First, the etching technique will be described with reference to the pendant illustrated in FIGS. 1A and 1B. In general, the etching technique works by forming a negative photoresist image of the desired shape on a sheet metal workpiece (e.g. gold), and etching away unprotected regions of the sheet metal workpiece.

As the initial step in the etching technique, art work for the front and the back of the pendant is generated, and the front and the back are transferred as solid black lines onto clear acetate. As shown in FIGS. 2A and 2B, cutout lines are designated 1, and design lines are designated 2. As further shown in FIG. 2A and 2B, the outline of a frangible link 4 is added at this time. The frangible link will prevent the pendant from completely separating from the sheet metal workpiece during the etching process. Thus, the pendant will remain attached to the sheet metal workpiece and will not fall to the bottom of the etching solution. This aids in the final finishing and collection of pendants.

The workpiece is coated on both sides with a photoresist material. The photoresist is a well known dry application type, which is coated onto both sides of the workpiece. The photoresist material reacts when exposed to light. Unexposed material may be rinsed away in a solvent, whereas exposed photoresist material will remain on the surface of the workpiece.

Starting first with the sheet of clear acetate having the pattern illustrated in FIG. 2A, the sheet of acetate is held tightly against a first surface of the workpiece and exposed to light. Then, reversing the metal sheet, and carefully aligning the workpiece with respect to the already-exposed first surface, the sheet of acetate having the pattern illustrated in FIG. 2B is held tightly against the reverse surface and a similar exposure step is performed on the back of the gold sheet.

The workpiece is then dipped in solvent, which removes those portions of the photoresist that have not been exposed to light. This essentially results in a negative image of the patterns illustrated in FIG. 2A and 2B on the front and back surfaces of the workpiece. With a typical jewelry pattern, such as the illustrative pendant being used here, most of the gold sheet is now protected with developed photoresist, and only areas corresponding to cut-out lines 1 and design lines 2 are left unprotected.

The exposure process, however, is imperfect, and requires touch-up. This is a manual step and is performed by carefully observing the developed photoresist on the gold sheet and applying with a fine brush additional photoresist to those areas which should have been, but were not, protected.

At this point, a cross section along line A—A in FIG. 2B through the workpiece is as depicted in FIG. 3A. In FIG. 3A, the workpiece is denoted by reference numeral 8, and the developed photoresist is denoted by reference numeral 3. Cutout areas 1 are unprotected from both sides of the workpiece, while design areas 2 are unprotected only from the top of the workpiece.

The workpiece with the photoresist pattern is then immersed in an etching bath. The workpiece remains in the etching bath for the period of time necessary for the etchant to remove approximately one-half the thickness of the sheet. At this time, a cross-section through the workpiece is as depicted in FIG. 3B. There, it can be seen that cut-out lines 1 have been dissolved from both sides of the workpiece and meet in the center of the workpiece. On the other hand, design lines 2 are only etched from the front of the workpiece, and are therefore only approximately one-half through the workpiece.

After the etching time has expired, the workpiece is removed from the etching bath and the photoresist layer removed by solvent. Frangible link 4 is broken to remove the pendant from the workpiece, and the pendant is polished to a finished state.

While the etching process is relatively straight-forward, there are a number of disadvantages. Primarily, etching is only suited for relatively thin materials. That is, if the etching period lasts too long, the etchant begins to attack the photoresist material itself. Thus, etching is used primarily for thin articles of jewelry.

Further, as well as being suited for relatively thin articles, the etching process is only well-suited for etching pure materials. That is, etching does not work well on layered materials such as gold layer. For example, FIG. 4 shows a base material 5 layered on both sides with gold layer 6. Typically, the base material will be a gold-colored material such as brass. In any event, the etching rates for the gold and the base materials are different. Thus, during the etching process, the arrangement shown in FIG. 4 is obtained. In particular, it can be seen that the base material 5 has been etched to a greater extent than the gold layer 6. At the edges of the finished article, this results in an undesired undercutting of the pendant at those portions corresponding to cut-out lines 1. Further, when two etching portions are in close proximity, a weak link such as shown at 9 may result.

There are a number of other disadvantages. For example, the front to back alignment of the pattern is critical, and if the alignment is not well performed, the process will not work. Further, recovery of gold dissolved during the etching process is complicated and time-consuming, and it involves a number of steps such as precipitation of the gold, collection of the gold precipitate, and refining. All of these steps are time-consuming and involve costly chemicals.

Further, with the simple etching process described above, only one level of design may be obtained. That is, unless multiple photoresist application steps are performed, design areas in the finished article are all the same depth and all constrained to be approximately one-half the depth of the gold sheet, corresponding to the time that the gold sheet is in the etchant bath.

Finally, the overall turn-around for the process is long. In particular, changes to the design are not easily made and such changes require a full repetition of all of the above steps.

The second known method for producing articles of jewelry is the stamping method, and will be described with respect to FIGS. 5A and 5B.

As shown in FIGS. 5A and 5B, the stamping method entails the preparation of two dies, a front die (FIG. 5A) with the desired design inscribed thereon, and a punch-out die (FIG. 5B) defining the perimeter of the article.

The design lines are formed by raised pieces of metal in the die and are transferred to the workpiece by stamping.

The punch-out die shown in FIG. 5B comprises only cut-out lines 1. The cut-out lines are formed in the die so as to enable the finished pendant to be punched from the workpiece.

To fabricate a pendant using the stamping method, the workpiece is initially brought to a design impressing station where the die shown in FIG. 5A is forcefully brought into contact with the surface of the workpiece, thereby to impress its design on the workpiece. Subsequently, the workpiece is brought to a punch station, where it is carefully aligned with the design already formed on the sheet. The punch-out die shown in FIG. 5B is forcefully brought down on the gold sheet, thereby separating the pendant from the gold sheet.

While the stamping method is quick and easy to automate, it suffers from several disadvantages. For example, like the etching method, the stamping method is unsuitable for thick pieces. Further, the method is relatively inflexible, and if a new design is required, both a new die and a new punch-out die are required. The preparation of these dies, is, of course, time-consuming, expensive, and not well suited for automatic processing.

While the stamping process does not suffer from the gold recovery problems of the etching method (since scrap gold is already in the form of a gold sheet), the stamping method is relatively inefficient in its use of the full surface area of the gold sheet. That is, whereas the etching method can virtually fill a gold sheet with patterns of jewelry, the stamping method requires a certain minimum area on the gold sheet for grasping the sheet during the stamping process. Further, the gold sheet cannot be stamped to an extent so as to weaken the gold sheet, since such weakening would not permit the sheet to be held firmly for subsequent stamping processes.

Finally, the stamping process gives an undesired drawn-down shape to the edges of the finished piece. Thus, as shown schematically in FIG. 6, the edge of the finished article after stamping has been drawn to a sharp edge 10 by the punch-out die. This edge must be removed manually, a process that is time-consuming and inconvenient, especially for internal punched-out portions such as portions 1A in FIG. 5B. That is, internal punched-out portions 1A are relatively inaccessible and are often very fine.

The third known method for producing jewelry is the casting method, commonly called the "lost wax" method.

In the casting method, a model of the finished article is prepared from a suitable material, usually paraffin or wax. A master is then formed by encasing the model in a second suitable material, for example, plaster or clay. The master is cut in half, and the model removed from the interior of the master. The interior of the master is polished, and imperfections during the molding process are removed.

From the master, several wax models are created. All the wax models are encased in a plaster mold leaving a suitable sprue for the introduction of molten metal. The plaster mold is heated, thereby melting the wax models which flow out of the sprues.

Molten metal is then poured through the sprues into the vacancies left by the melted wax models. The mold is cooled and the jewelry articles are freed from the mold. The jewelry articles are then finished, for example by polishing their surfaces.

The casting process is a complex and time-consuming process that is relatively unsuited for thin pieces of jewelry. The process is work-intensive, and the cost is high. Special expertise is required to form the masters and molds, and, in any event, the process is unsuited for high volume work. The surface of the molded article invariably needs polishing, since the casting process does not leave a smooth finish on the article. Again, this is a one-at-a-time process requiring special skill and expertise. Finally, the process is not amenable to design changes. That is, any change necessitates the creation of a complete new model, a new master, and a new mold.

To summarize, the three known processes are all relatively work intensive and involve too many manual steps. The recovery of unused gold is uncertain, and many of the processes are unsuitable for use with certain materials. Turn-around time from a new design, or design change, to a finished article is high, and the process is not flexible. Alignment of cut-out portions and design portions is often critical. Additionally, from the above description, it will be appreciated that only solid pieces of jewelry can be created by the casting process. That is, it is not straight-forward to provide a finished piece of jewelry consisting of a base material such as brass surrounded by a gold layer.

SUMMARY OF THE INVENTION

It is an object of the present invention to eliminate these and other difficulties found in conventional processes for fabricating jewelry.

It is a further object of the present invention to provide a novel apparatus and a novel method for using the apparatus to fabricate high-quality articles of jewelry having desirable characteristics. The apparatus takes advantage of the flexibility and speed of the computerized XYZ mechanical table to provide a jewelry manufacturing apparatus capable of high-speed fabrication of jewelry with low turn-around time for changes in designs or creations of new designs. The novel process utilizes the apparatus in an easily automated process for high-speed, high volume fabrication of jewelry. Finally, the article of jewelry itself has several unique properties which may be traced directly to the apparatus and the process used to create it.

These and other objects and features of the present invention are obtained through the provision of a jewelry manufacturing apparatus comprising input means for inputting a pattern of jewelry that includes a design portion and a cut-out portion, mounting means for mounting a workpiece from which the jewelry is to be fabricated, machining means for machining the workpiece into the desired article of jewelry, and processing means for transferring the design portion and the cut-out portion from the input means to the machining means, thereby to cause the design portion to be transferred to the workpiece and the article of jewelry to be cut out in accordance with the cut-out portion. In preferred forms of the invention, the machining means comprises an XYZ computerized table, and the mounting means includes a flat plate onto which the workpiece, for example, a gold sheet, is laminated.

The novel method described herein comprises the steps of providing a jewelry cut-out portion and design portion in a form suitable for controlling an automatic cutting table, mounting a workpiece on the mechanical table, inscribing the design portion onto the workpiece, cutting the cut-out portion out of the workpiece, and removing the workpiece from the mechanical table. Preferably, the mounting step is performed through the intermediary of a backing plate, and the removing step includes removing the finished jewelry from the backing plate.

This brief summary is provided so that the nature of the invention may be understood. However, the invention is described in significantly more detail in the following Description of the Preferred Embodiment in conjunction with the accompanying drawings, both of which form a complete part of the specification.

DESCRIPTION OF THE DRAWINGS

FIGS. 5A and 5B are plan views of a design die and a punch-out die for pendant, used in explaining a stamping process;

DESCRIPTION OF THE PREFERRED EMBODIMENT

A preferred embodiment of the novel jewelry making apparatus will be described in connection with FIG. 7.

Figure 7:
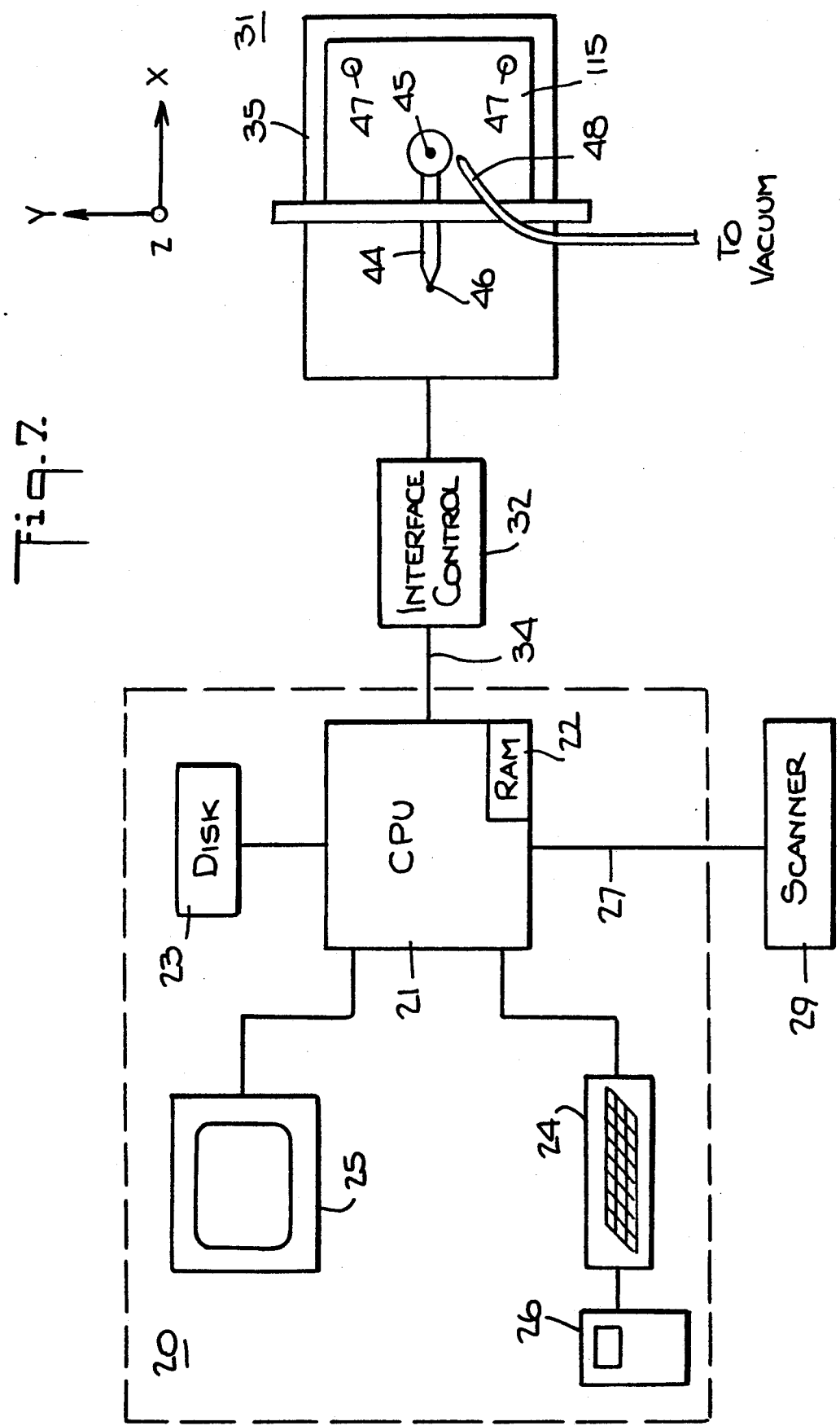
FIG. 7 is a block diagram of a jewelry making apparatus according to the present invention.

In FIG. 7, reference numeral 20 designates a well-known personal computer comprising a central processing unit (CPU) 21, including internal random access memory (RAM) 22. Connected to the CPU are a mass storage device 23, for example, a magnetic disk, a keyboard 24, and a graphics monitor 25. Conveniently, a mouse 26 is also attached to the CPU through the keyboard.

The personal computer 20 is of a well-known type and will not be described in great detail here. For example, any IBM compatible PC system may be employed.

Also attached to the CPU through an RS-232 communications link 27 is an optical scanner 29. The optical scanner is of a well-known type which scans an original image on a line-by-line basis to create a raster or pixel representation of the image. A scanner providing 300 dots per inch resolution provides satisfactory performance for use with the invention. Such a scanner is manufactured by Princeton Graphics as Model No. LS-300.

A computer-controlled XYZ table, designated generally at 31, is also connected to personal computer 20. Such tables are well-known and are of a type that permits computer control of a machine head in mutually orthogonal X, Y, and Z directions, all as depicted in FIG. 7 (wherein the Z direction is out of the page). For Table 31, a table distributed by Techno, Inc., which has a resolution of 0.0005 inches over a 20 inch (X) by 20 inch (Y) by 2 inch (Z) range may be used, although it should be modified to the "upside-down" configuration described below. This table has the ability to move the machine head accurately to the same position time after time, within plus or minus 0.0001 inches. Slew rates and feed rates are not critical to the invention, and only affect the speed at which jewelry is manufactured. For example, slew and feed rates may be selectible within a range of 0.5 inch/min. to 30 inches/min.

Table 31 is connected to computer 20 through interface/controller 32. More specifically, interface/controller 32 accepts table control commands from computer 20 over communication link 34, in this case, an RS-232 interface. Interface/controller 32 converts table commands to incremental table movements and supplies such incremental movements to table 31.

The surface of the machine table must be flat so as to provide a reference surface against which to machine the article of jewelry. The surface of conventional tables often sags under the combined weight of the surface itself and the weight of the X,Y and Z axis drives that are ultimately supported by the underside of the machining surface.

To overcome this difficulty, an "upside down" drive configuration is preferably used for the machine table.

The configuration is "upside down" because the guide rails for the X axis have been removed from their normal position (mounted on the underside of the machining surface), turned "upside down", and mounted to an auxiliary base plate. In this way, the machining surface supports only its own weight, and not the weight of the X, Y and Z axis drives.

Figure 8A:
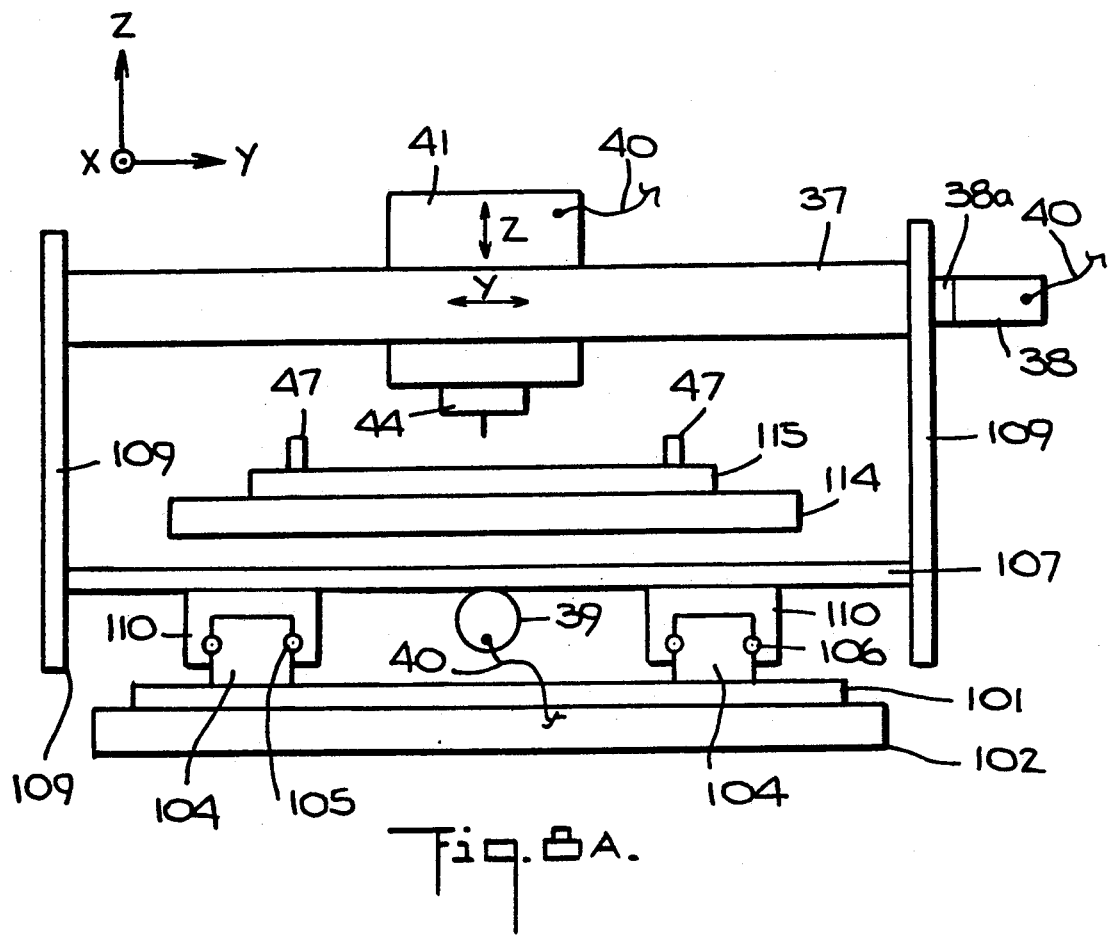
FIGS. 8A and 8B are views showing details of the computerized XYZ table shown in FIG. 7.
Figure 8B:
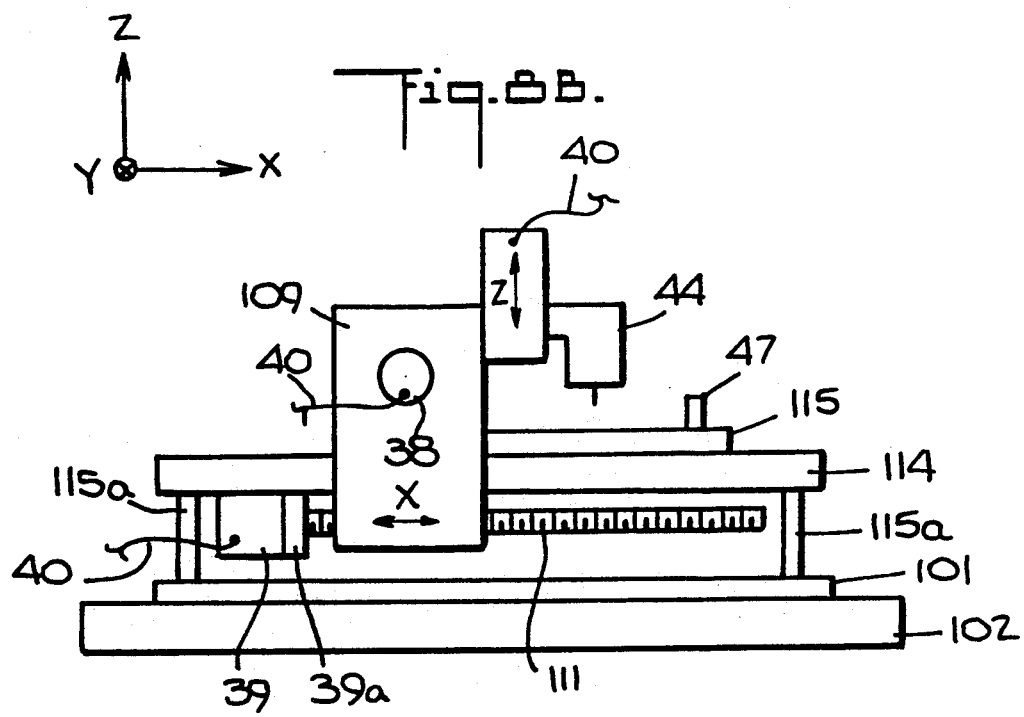

Such a configuration is shown schematically in FIGS. 8A and 8B, in which FIGS. 8A is a cross-section of the table looking along the X axis. As seen there, the table includes a table base 101 supported by a steel plate 102 that lends structural weight and rigidity to the overall apparatus. A pair of rails 104 extend along the length of the table in the X axis direction and are mounted on table base 101. The rails have semicircular cutouts 105 at both lateral sides thereof. Each semicircular cutout 105 receives a steel tracking rod 106 which acts as a track for the X axis.

A horizontal bar 107 is disposed perpendicularly across rails 104. Distal ends of the bar 107 are provided with supports 109 which support horizontal bar 37. Horizontal bar 37 in turn supports the Y and Z axes and the Y and Z axis drives in a conventional manner.

The underside of horizontal bar 107 is provided with a pair of guides 110, each having a pair of semicircular cutouts designed to accept tracking rods 106. A threaded rod 111 (see FIG. 8B), driven by stepping motor 39 is provided for movement in the X direction. Thus, in combination, rails 104, tracking rods 106, guides 110 and horizontal bar 107 together constitute a support system for the X, Y and Z axis drives that depends not from the machine surface but from table base 101.

The machining surface is a granite slab 114 stationarily supported by legs 115a (see FIG. 8B) over horizontal bar 107. Because of this arrangement, the working surface need only support its own weight.

A pin hole vacuum plate 115 is fixed to the upper surface of granite slab 114. The vacuum plate permits secure yet easily removable positioning of the workpiece on the surface of the table.

Other means may alternatively be used for securing the workpiece on machine surface. The workpiece may, for example, simply be bolted to the surface. The pin hole vacuum plate is, however, preferred since it uniformly attracts all areas of the workpiece to the surface, thereby preventing any bulges or nonuniformities in the surface of the workpiece.

A pair of alignment posts 47 are mounted on the pin hole vacuum plate 115. The alignment posts are designed to be inserted into corresponding holes in a workpiece to provide front-to-back alignment of the workpiece, as will be described hereinbelow.

Movement of bar 107 is provided by a stepper motor 39 acting in response to the incremental commands from interface box 32 that are supplied through line 40. In the embodiment shown, line 40 is a multi-use line and carries commands for the X, Y, and Z directions.

Support member 41 is mounted for movement in the plus-minus Y direction on horizontal bar 37. Movement of support member 41 is provided by a stepper motor 38 acting in response to the incremental commands from interface box 32 supplied through line 40.

Machine head 44 is mounted for movement in the plus-minus Z direction on support member 41. Movement of machine head 44 is provided by a stepper motor (not shown) acting in response to the incremental commands from interface box 32 supplied through line 40.

To minimize costs, interface/controller 32 which controls X stepper motor 39, Y stepper motor 38 and the unshown Z stepper motor (which drive the X, Y and Z axis, respectively) operates in an "open loop" control mode. That is, a position counter internal to the repositioning control is reset only when the stepper motors are brought to "home" position. Driving operation of the table, the stepper motors are driven incrementally without any feedback as to their actual position.

Because of the open loop control mode, it is possible for the stepper motors to lose track of their actual position, for example, through a spurious driving pulse or a lost driving pulse. This problem could, of course, be corrected through the use of a more expensive control which operates in a "closed loop" control mode. In closed loop control, the stepper motors each include an encoder wheel which provides a continuous position indication for its associated stepper motor. The repositioning controller uses the position indication constantly to correct any position errors that may have occurred.

While the source of the position errors is not altogether clear, most position errors can be attributed to undamped frequency resonances in the overall structure. These resonances find their way to the shaft of the stepper motor where they cause extra or lost incremental movement.

To reduce these undamped frequency resonances, frequency dampers 38a and 39a are attached directly to the shaft of each stepper motor 38, 39 in a position directly adjacent the stepper motor. Suitable dampers are commercially available from Ferrofluidics Corp. of Nashua, N.H. and are known as "magnetic motor dampers". The dampers do not completely eliminate the position error problem; nevertheless, they serve to reduce the frequency resonances to a point where the position error problem is tolerable. In this regard, Ferrofluidics provides several models of "magnetic motor dampers", each tuned to a different frequency. Because each installation is different, a certain amount of experimentation is needed to select the best damper, and it may be found that each stepper motor operates best if a different frequency is damped.

Referring again to FIG. 7, machine head 44 supports both a rotary cutting tool 45, and a non-rotatable diamond tipped scribing tool 46. Cutting tool 45 is provided for cutting the cut-out portions of the article of jewelry, while scribe 46 is provided for inscribing the design portion of the article of jewelry. In the present embodiment, cutting tool 45 is rotated at about 20,000 revolutions per minute by an unshown spindle motor. The working end of cutting tool 45 terminates in a sharp blade (see FIG. 14) effective to cut through and to remove the metal to which tool 45 is applied.

On the other hand, scribe 46 is effective only to inscribe a design into the surface of the workpiece by pushing metal away rather than removing it. Of course, if desired, the design portion may be cut from the metal workpiece using cutting tool 45 controlled to a proper depth in the Z direction.

One or the other of the cutting tool 45 and scribe 46 may be moved as desired into position over a workpiece mounted on work surface 35. In the present embodiment, this is accomplished through a series of locking pins and detents so that the proper tool may be selected and locked into position over the workpiece. Of course, it is conceivable to provide only a single mounting position on head 44 and to replace the cutting tool and the scribe as desired.

It should also be evident from a reading of this disclosure that more than one cutting/scribing station may be defined on head 44. That is, to provide for multiple work stations from a single XYZ table, a series of cutting/scribing stations may be mounted on head 44 to provide for simultaneous work on a plurality of workpieces.

Tube 48 (see FIG. 7) provides a lubricant to facilitate cutting operations. The tube 48 terminates at a position close to the cutting position to permit application of the lubricant at the desired location.

The operation of the apparatus in FIG. 7 to create articles of jewelry will now be described with reference to the flowchart shown in FIG. 9.

Figure 9:
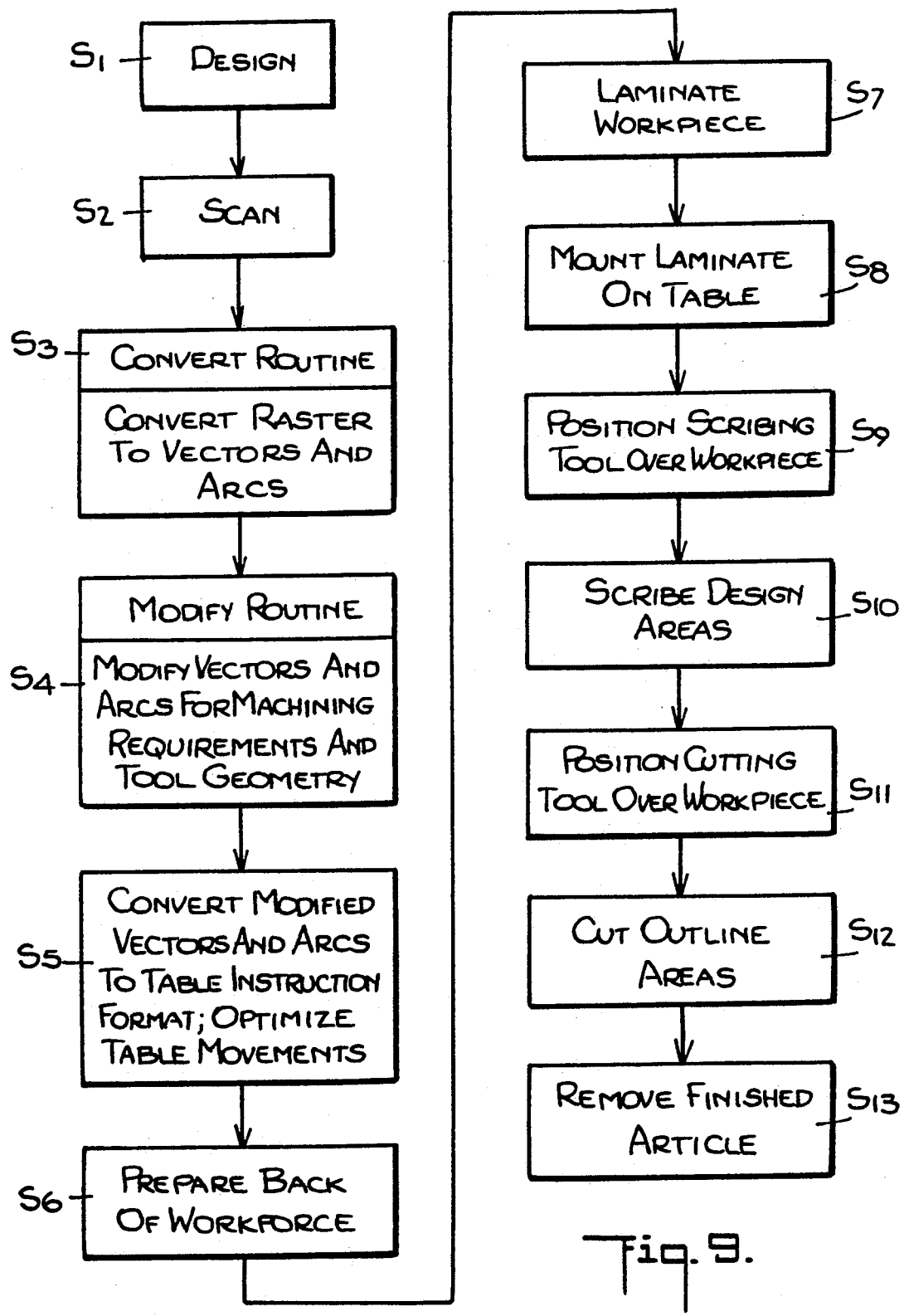
FIG. 9 is a flowchart for explaining the jewelry making method of the present invention.

In the specific embodiment illustrated in FIG. 9, the process of fabricating an article of jewelry comprises the steps of designing the artwork of the jewelry, scanning the artwork by scanner 29, converting the raster output of scanner 29 into a vector and arc information, modifying the vector and arc information to compensate for cutting tool, geometry and machining requirements, converting the vector and arc information into XYZ table instruction format and optimizing the movement of the table, preparing the back of the workpiece with appropriate markings, laminating the workpiece to a backing plate, mounting the workpiece with its backing plate on surface 35 of the XYZ table, positioning the scribing head over the workpiece and scribing the design portion of the article of jewelry, positioning the cutting head over the workpiece and cutting the cut-out portion of the jewelry, and removing and finishing the jewelry. Each of these steps will be described in more detail herein below.

At step S1, the artwork for the jewelry is formed. To provide the highest resolution possible, we have found it convenient to provide the artwork for the jewelry at four times actual size. The artwork is drawn on plain white paper using black india ink, or by any other process providing high contrast.

While this method is preferred, any method for forming the artwork may be used. For example, computer painting programs are readily available, as are computer aided design programs. Some of these programs provide the artwork directly in vector format, in which case Step S3 may be eliminated.

Figure 1A:
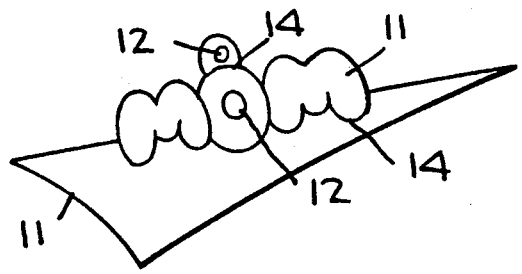
FIGS. 1A and 1B are the obverse and reverse sides of an illustrative article of jewelry.
Figure 1B:
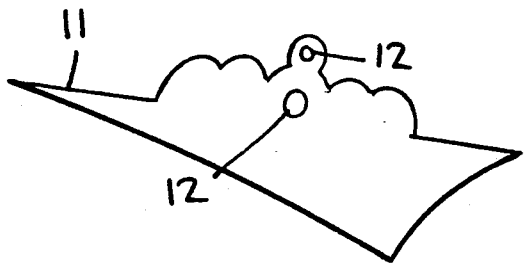
Figure 2A:
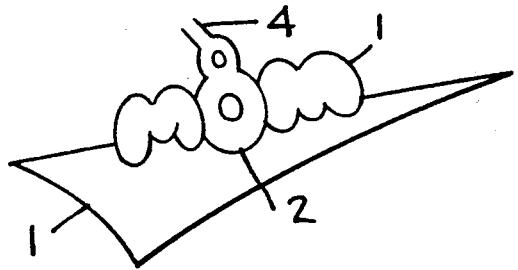
FIGS. 2A and 2B are front and back artwork for a pendant used in explaining an etching process.
Figure 2B:
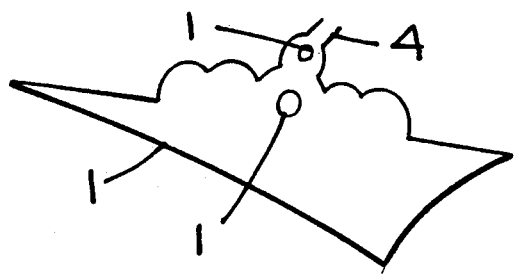
Figure 3A:
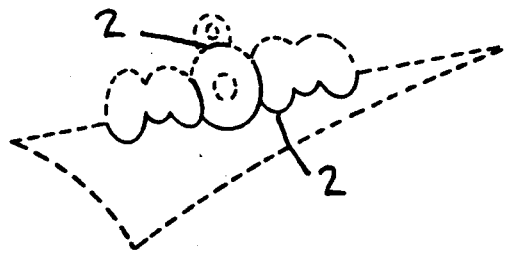
FIGS. 3A and 3B are cross section of the pendant in FIGS. 2A and 2B before and after etching, respectively.
Figure 3B:
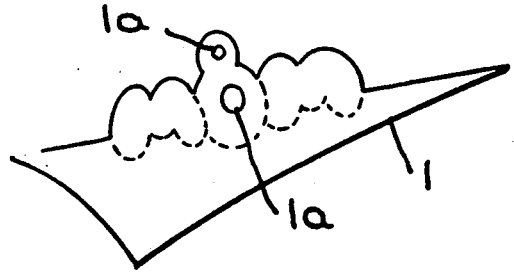
Figure 3A:
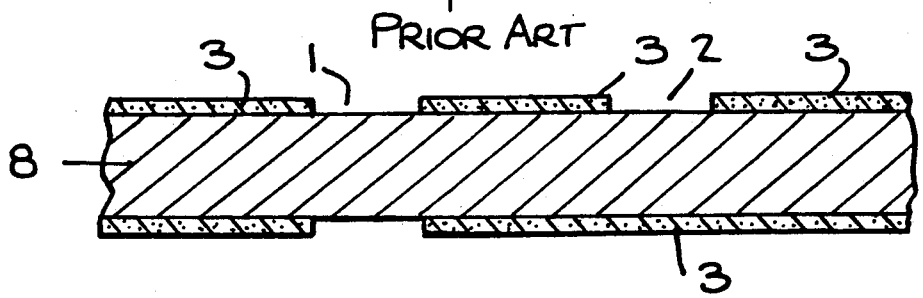
Figure 3B:
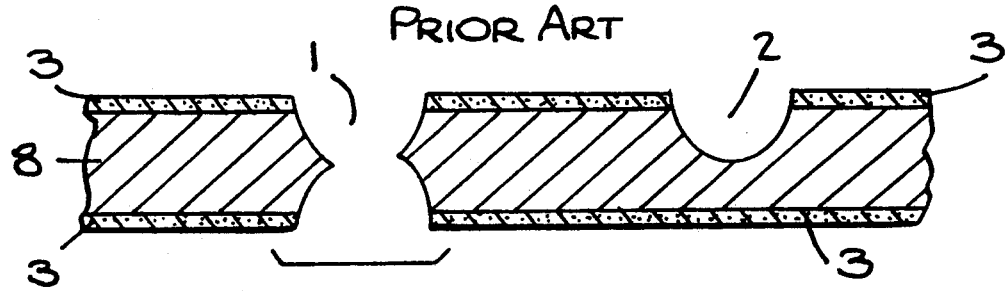
Figure 4:
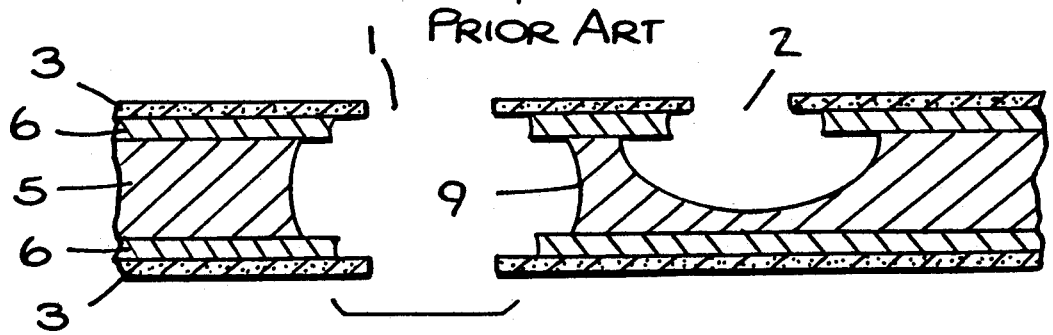
FIG. 4 is a cross section showing etching on a layered material.
Figure 6:
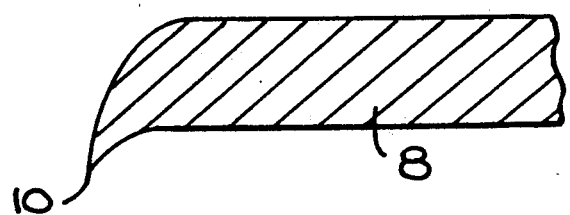
FIG. 6 is a cross-sectional view of the edge of a stamped pendant.
Figure 10:
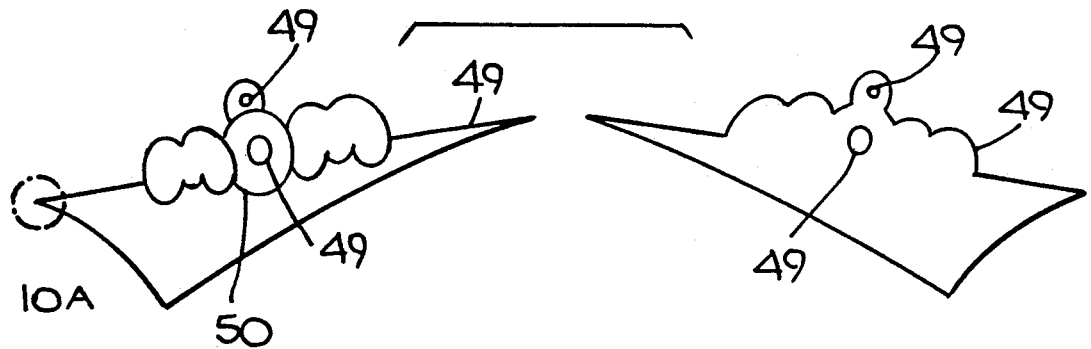
FIGS. 10, 10A and 10B are views for explaining an image scanning step and a scanned image processing step of the present invention.

In the present embodiment, the artwork required is templates for both the front and the back (or mirror image) of the article of jewelry. Using the pendant design described with respect to FIG. 1 as an example, the artwork required is shown in FIG. 10. It will be seen that this artwork is somewhat similar to that required for the etching process, requiring a series of cut-out lines 49 and design lines 50. A frangible link is not required for the instant inventive process, because, as will be seen below, the workpiece will be supported by a backing plate.

At step S2, the artwork is scanned into computer 20 using scanner 29. As described above, the scanner converts the artwork into a raster or pixel image comprising an array of picture elements representing the artwork designed in step S1.

At step S3, the raster format is converted into vectors and arc lengths more suitable for use in subsequent steps. Software suitable for processing in the convert routine is available from CNC Software under the name Master Cam. The convert routine illustrated at step S3 in FIG. 9 is shown in more detail in FIG. 11.

Figure 10A:
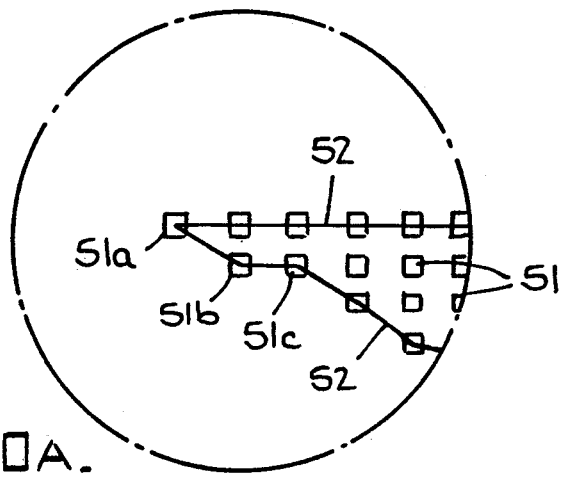
Figure 11:
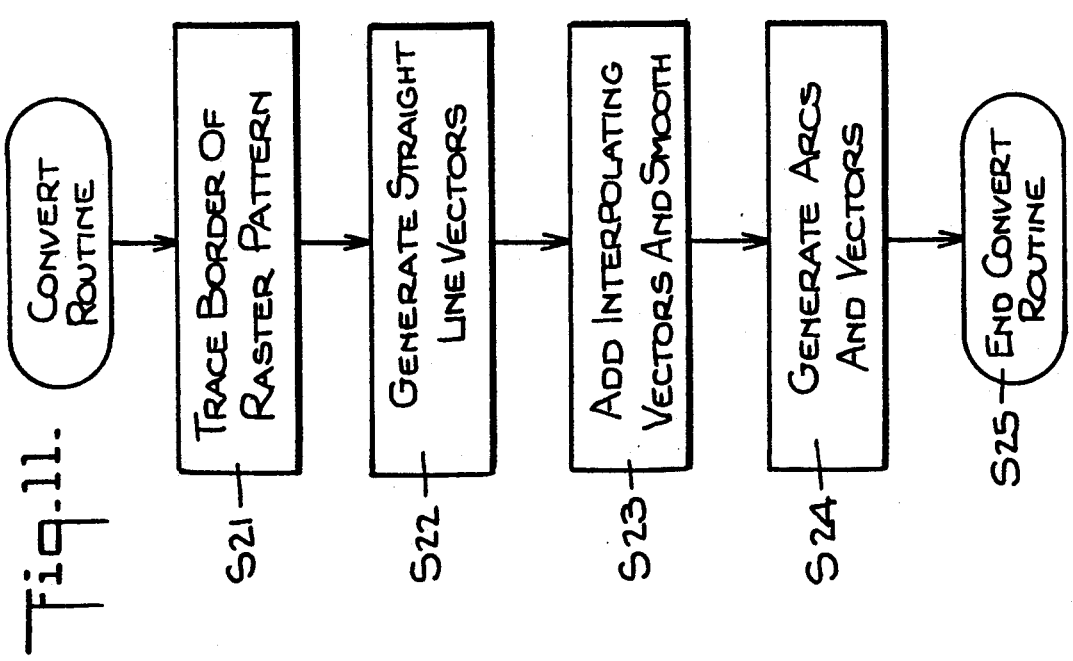

In FIG. 11, it will be seen that the convert routine begins at step S21 with the step of tracing the border of the pattern. For example, if the area encircled in FIG. 10 is blown up to show its pixel or raster representation, the pattern shown in FIG. 10A will result. In FIG. 10A, individual pixels are represented at 51. The step performed in step S21 comprises locating the edges of the pattern and drawing a border, as indicated by lines 52.

At step S22, the border 52 traced at step S21 is converted into a series of straight-line vectors. That is, the line from pixel 51A to 51B is represented as a first straight-line vector, the line from pixel 51B to 51C is represented as a second straight-line vector, etc. These vectors are stored within computer memory 22.

Figure 10B:
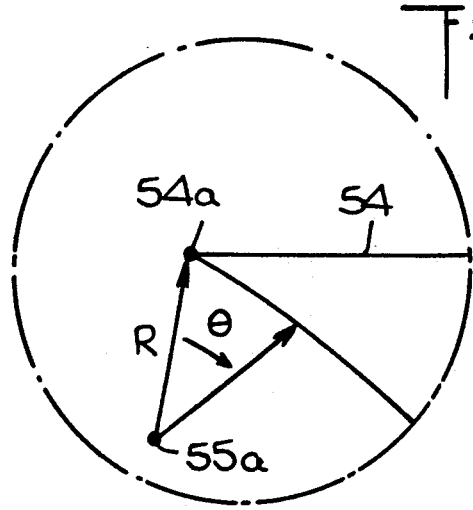

At step S23, the pattern of straight-line vectors is smoothed by adding interpolating vectors and removing sharp corners. At step S24, the smoothed vectors are converted into a series of arcs and vectors. That is, as shown in FIG. 10B, straight line portions are differentiated from curved line portions. The straight-line portions are represented by a single vector, for example 54, by a vector origination point 54A, a vector direction and a vector length. Curved portions are represented by a center 55A of a circle of radius R, a beginning point 54A, and an angle $\Theta$ that the arc subtends.

At step S25, the convert routine terminates and the sequence of arcs and vectors are provided to the routine known in FIG. 9.

Referring again to FIG. 9, at step S4, the sequence of vectors and arcs are modified to compensate for machining requirements and the geometry of cutting tool 45 and scribe 46. Software suitable for performing the modify routine is available from Cimex, Inc. under the name Cimex. The modify routine is described in more detail in FIG. 12.

Figure 12:
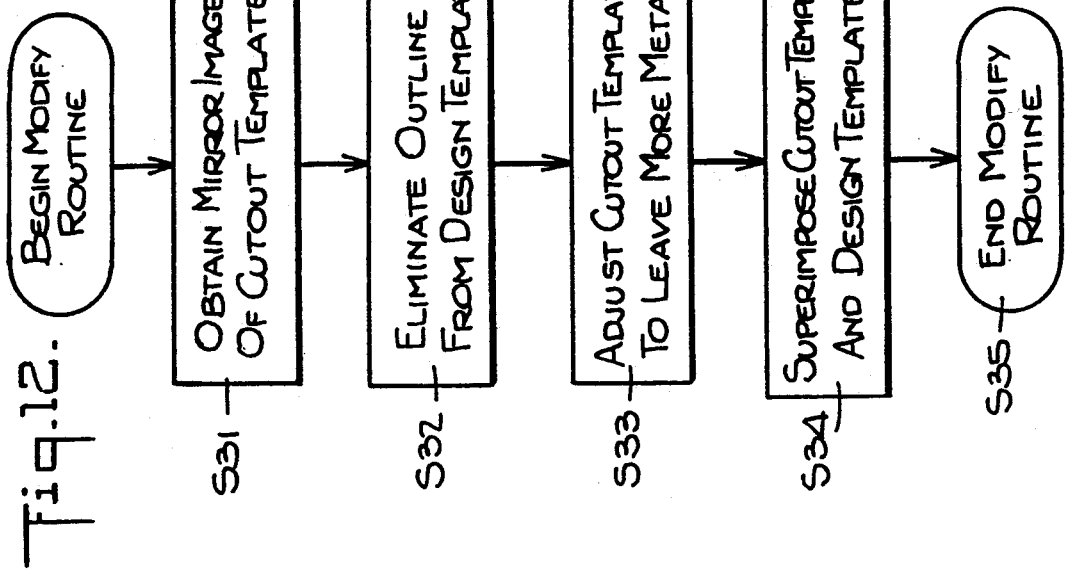
FIGS. 11 and 12 are detailed flowcharts for certain steps in FIG. 9.
Figure 13A:
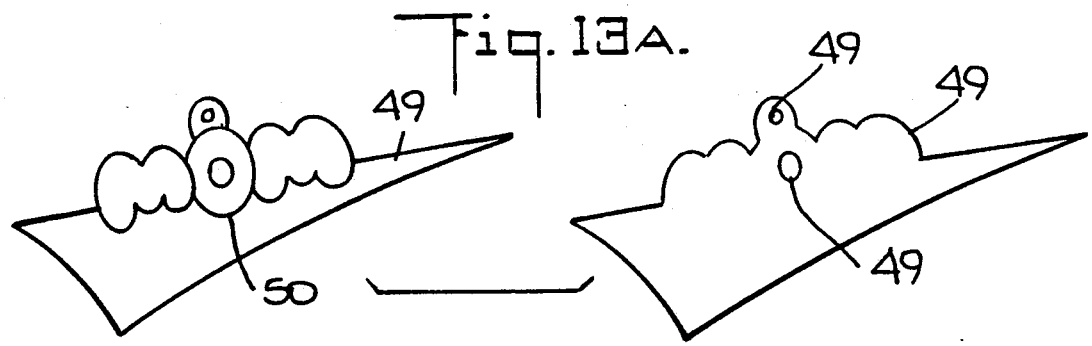
FIGS. 13A, 13B, 13C and 13D are views for explaining template processing steps of the present invention.

As shown in FIG. 12 at step S31, the template for the back of the pendant is flipped so as to obtain its mirror image. Thus, as shown in FIG. 13A, the vectors and arc lengths for both the front and back templates of the pendant are now viewed from the same perspective, specifically the front of the pendant. This, of course, is the side from which the pendant will be cut from the workpiece.

Figure 13B:
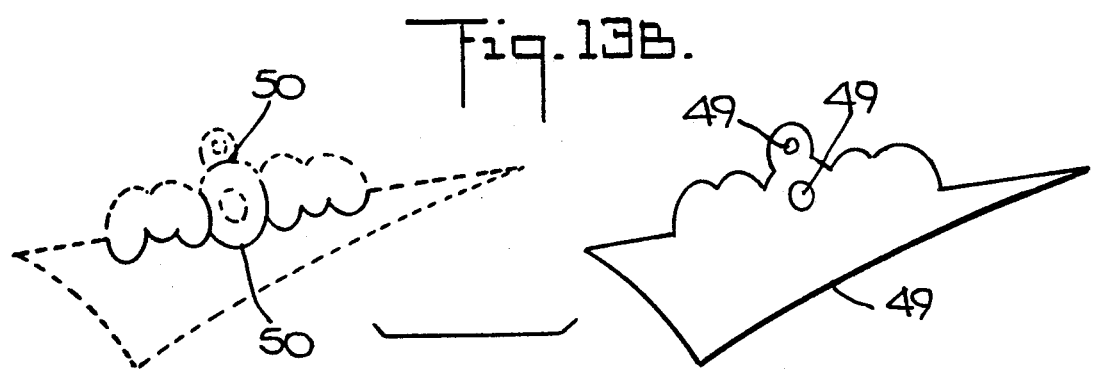

At step S32, the front template of the pendant is modified so as to eliminate its outline and leave only design areas. Thus, as shown in FIG. 13B, everything except the design portion that is to be scribed by scribe 46 has been eliminated.

Figure 13C:
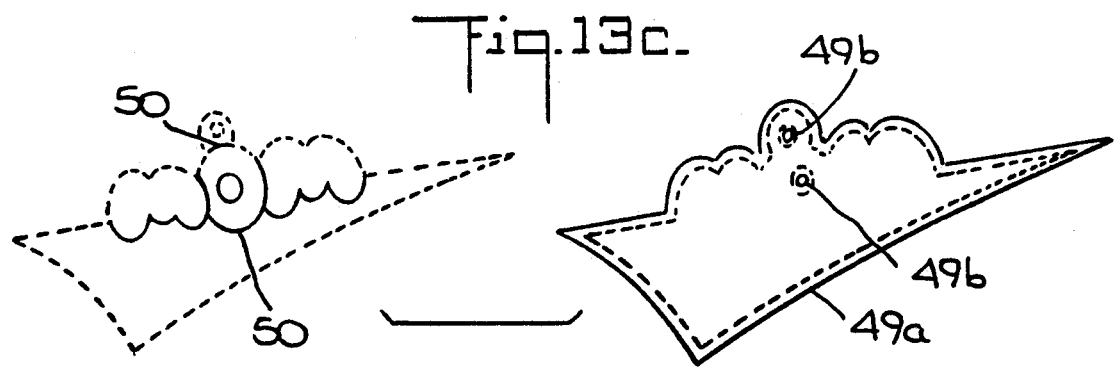

At step S33, the back template which comprises only cut-out portions is adjusted to compensate for machine requirements and cutting tool geometry. This is illustrated in connection with FIG. 14, which shows a cross-section of the workpiece with cutting tool 45 in place thereon. It will be seen that the tip of the cutting tool makes an angle $\Theta$ with respect to the surface of the workpiece. Thus, the top surface and the bottom surface of a cut-out portion will be deviated with respect to each other by a distance indicated by 56. Therefore, so as not to remove more material than desired and undesirably change the appearance of the pendant, the cut-out portion is modified to leave more metal. This is shown by the dotted lines on the back template in FIG. 13C. Each cutout portion is expanded (in the case of an external edge 49a) or contracted (in the case of an internal edge 49b) on its own center. The precise amount of additional metal to leave uncut varies in accordance with the thickness of the workpiece and angle Θ, and can easily be determined by reference to FIG. 14.

Figure 13D:
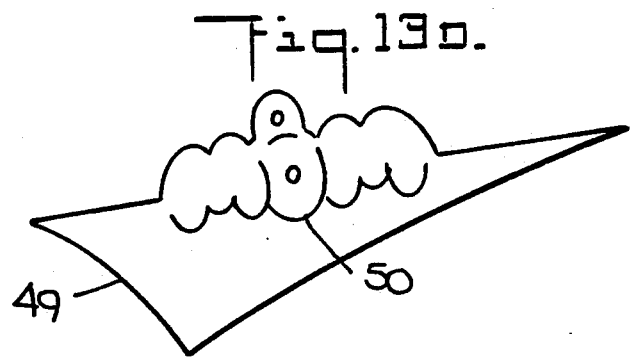

At step S34, the cut-out portion 49 and the design portion 50 are superimposed so as to obtain a common origin for machine instructions. The superimposition is shown in FIG. 13D.

At step S35, the modify routine ends and the superimposed images, still in the form of vectors and arcs, are supplied back to the routine in FIG. 9.

Referring again to FIG. 9, at step S5 the vectors and arcs are converted into table instruction format and the ordering of the table's instructions are optimized so as to reduce the routine time. Beginning with step S6, the attention shifts to the actual sheet of metal comprising the workpiece. Thus, at step S6, the back of the workpiece is prepared as necessary, for example by inscribing a gold content indication (e.g., "14K") or a copyright notice. This step is facilitated if the workpiece is provided with alignment means such as holes or notches 61 (see FIG. 15). Such alignment means ensure that the inscriptions on back of the workpiece are properly aligned when the workpiece is flipped in the next step.

As step S7, the workpiece is flipped and laminated on a flat mounting surface, so that the surface prepared in step S6 faces the mounting surface. In the present embodiment, the mounting plate used is an aluminum plate selected primarily because it was extremely flat. However, any readily available material may be used as a mounting surface, provided it is extremely flat.

To mount the workpiece to the aluminum mounting plate, a layer of adhesive is applied to the aluminum plate using an aerosol adhesive spray. The workpiece is placed on the aluminum plate, and the laminate is rolled between a pair of rollers to affix the workpiece to the aluminum plate firmly yet removably. With this process, all areas of the workpiece are uniformly bonded to the aluminum backing to provide a firm support for every portion of the workpiece.

The aluminum sheet is also useful to absorb any error in the Z direction which would cause the cutting tool to project too far through the workpiece. That is, with the aluminum sheet in place, instead of cutting into surface 35 of the computerized Table 31, the cutting tip 45 will instead cut into the surface of the aluminum sheet.

Figure 15:
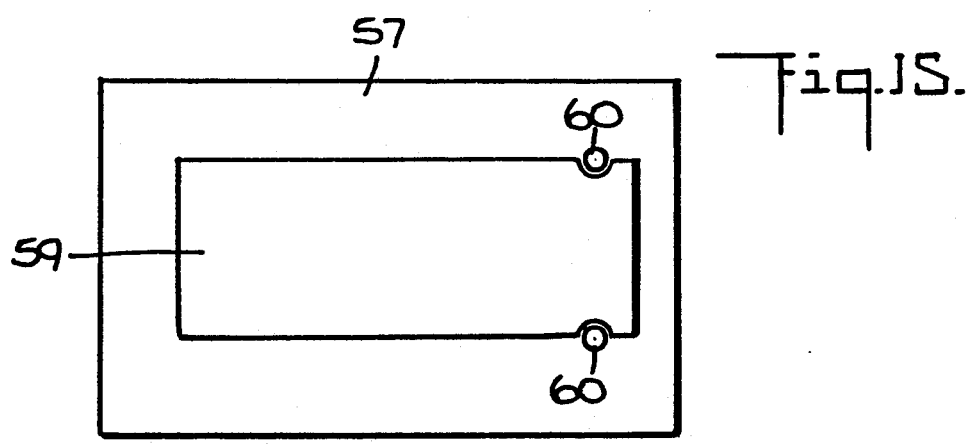
FIG. 15 is a plan view of a workpiece laminated to a mounting surface.

The laminated structure is shown in FIG. 15, in which 57 designates the aluminum plate and 59 designates the workpiece. In FIG. 15, two alignment holes 60 are also shown. These holes are aligned with notches 61 in the workpiece and are spaced in a position corresponding to alignment posts 47 on surface 35 of the XYZ table.

At step S8, the laminate structure is mounted on XYZ table 31 using the pin hole vacuum plate 115 in such a manner that holes 60 engage alignment posts 47. In this manner, the back of the gold sheet having the gold content or copyright notice affixed thereto is aligned in a known position with respect to machine head 54 (and consequently cutting tool 45 and scribe 46).

At step S9, scribe 46 is brought into position over gold sheet 59. At step S10, the design portion 50 is inscribed into the surface of the gold sheet. More specifically, CPU 21 transmits the table instructions obtained in step S5 and stored in RAM 22 over communication link 34 to interface box 32. Interface box 32 generates incremental table movements and transmits them over line 40 to horizontal bar 37, support member 41 and head 44, respectively. At this time, the Z or depth direction is controlled to approximately one-half of the thickness of sheet 59. During step S10, the design is inscribed to the surface of the workpiece.

Figure 14A:
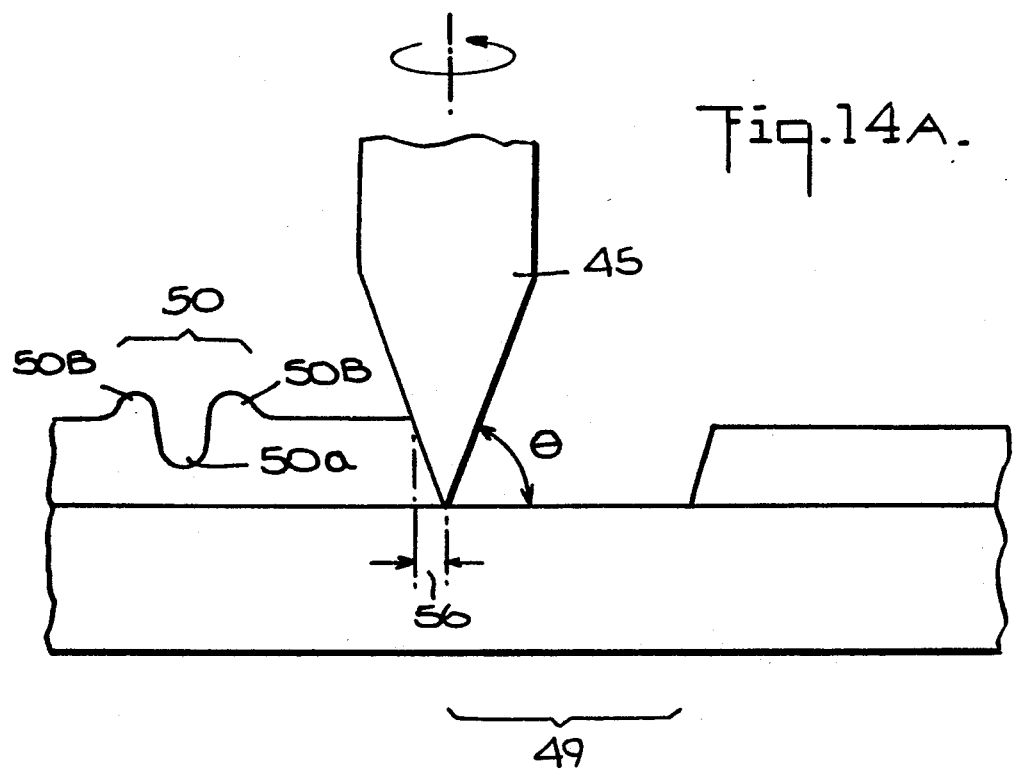
FIG. 14A and 14B are cross sectional view of a portion of an article of jewelry manufactured according to the invention.
Figure 14B:
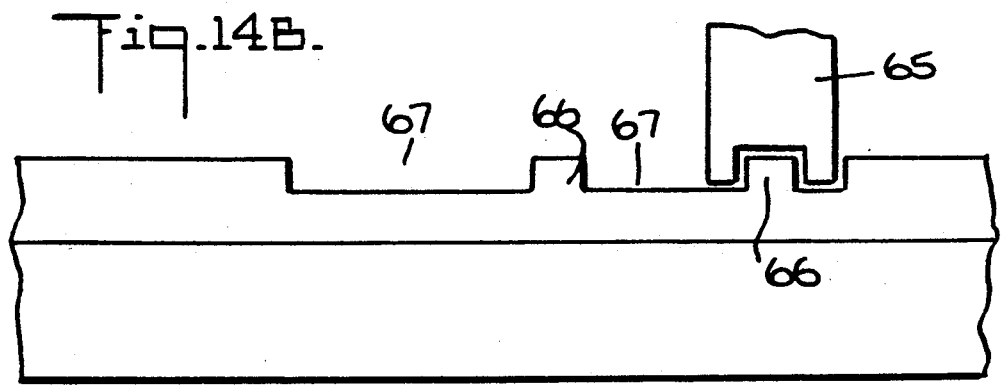

Since a diamond-tipped stylus is used in the scribing step, metal is not removed but is merely pushed to one side as the design is inscribed into the surface of the metal sheet. Thus, as shown in FIG. 14, which is a cross-section of the workpiece, design portion 50 consists of a central indented portion 50A surrounded by two mounds of metal 50B.

As described above, while a diamond-tipped stylus is preferred for use in the scribing step S10, other tools may be substituted. As a first example, a cutting tool, controlled to the appropriate depth, may be substituted, which removes metal for the design portion rather than pushing it to one side.

As a second example, a tubularly shaped tool with teeth in the end and an end mill may be substituted so as to form mounting posts for mounting diamonds or other stones in the article of jewelry. To form the mounting post, the tubularly shaped tool 65 (see FIG. 14B), initially not in contact with the workpiece, is positioned over the desired position for the mounting post. The tubularly shaped tool is lowered in the Z direction, thereby forming mounting post 66. This process is repeated at all positions where mounting posts 55 are desired.

The end mill is then substituted for the tubularly shaped tool and is used to remove unwanted material from areas 67 of the workpiece. In this manner, mounting posts are formed which may be utilized to mount diamonds or other stones.

Returning to FIG. 9, at step S11, the cutting tool is substituted over metal sheet 59. Alignment holes 60 in engagement with alignment posts 47 ensure that the gold sheet has not moved between the scribing and cutting steps.

At step S12, the cut-out portion of the pendant is formed. More specifically, as described above with respect to the scribing step S10, the table instructions obtained in step S5 are transmitted from the computer to interface box 32, where they are converted to incremental XYZ table movements, which are subsequently executed by table 31.

During the cutting step, the lubrication tube 48 provided at a position adjacent the cutting position is activated so that the workpiece is properly lubricated metal removed during the cutting step. As to recovery of scrap metal, it will be appreciated that the removed metal is already in a gold alloy form and requires no refining for subsequent use. The gold may be recovered by simply washing down the workpiece after the cutting step.

Finally, at step S13, the laminate structure is removed from XYZ table 31 and the finished pendant is released from aluminum plate 57. Although the pendant may easily be pried from surface 57, it is useful to utilize a solvent to dissolve the adhesive holding metal sheet 59 to aluminum plate 57, thereby permitting the finished pendant to fall free.

The embodiment of the invention described above is a generalized embodiment designed to permit the creation of customized jewelry. Other embodiments are also possible, for example, embodiments that create pseudo-customized jewelry from a standard set of options. For example, steps S1 through S5 of FIG. 9 may be performed in advance for a limited number of design options. Using a menu selection approach, the user may be permitted to combine a number of different preselected patterns into a pseudo-custom piece of jewelry. For example, the user may be permitted to select from among a number of predetermined basic patterns, for example, first names. Next, a background pattern might be selected from among a set of predetermined background patterns, for example, various floral designs. Next, the type of finish may be selected, for example, shiny or mat finish. Finally, the type of jewelry might be selected, for example, a bracelet, pendant or earring. All of these options and patterns would be preprocessed with respect to steps S1 through S5 of FIG. 9, and once the selections have been made by the user, only steps S6 through S13 of FIG. 9 need be performed to obtain a pseudo-customized article of jewelry.

Other modifications will be readily apparent from the instant disclosure to those skilled in the art. For example, although step S2 of FIG. 9 describes scanning of a design pattern that is cut to only one level, many such design pattern levels are possible. For example, by scanning a number of different designs, designs of varying depths may be inscribed into the article of jewelry, depths that vary from a Florentine finish to nearly through the entire workpiece. Conversely, of course, certain situations may arise when a design is not required; in such situations, only a cut-out portion or outline of the article of jewelry need be provided.

Similarly, other modifications of the invention will be apparent to those skilled in the art, and the embodiment described above should not be considered as limiting but only illustrative. Instead, the scope of the invention should be determined by reference to the claims attached hereto.

We claim:

1. An apparatus for manufacturing an article of jewelry from a workpiece comprising:
    input means for inputting a pattern for the article of jewelry;
    mounting means for removably mounting the workpiece thereon;
    machining means for accepting the mounted workpiece and for transferring a pattern corresponding to the pattern input by said input means to the workpiece; and
    processing means for processing the pattern input by said input means into a form suitable for said machining means and for causing said machining means to transfer the pattern to the workpiece,
    wherein said input means includes means for compensating for the geometry of said machining means by leaving more material on the workpiece than that called for by the pattern.

2. An apparatus according to claim 1 wherein said mounting means comprises a plate with an adhesive layer to which the workpiece is adhered.

3. An apparatus according to claim 1 wherein said machining means includes a work surface, said work surface including alignment means for positioning both the workpiece and the mounting means at a predetermined position thereon.

4. An apparatus according to claim 1 wherein said machining means includes a work surface that includes a pin hold vacuum plate for holding the mounting means uniformly on the work surface.

5. An apparatus according to claim 1 wherein said machining means comprises a three-axis machine head and a work surface for accepting the mounted workpiece.

6. An apparatus according to claim 5 wherein the three axes are arranged so that the work surface does not support them.

7. An apparatus according to claim 5 further comprising plural stepper motors associated with each of the three axes, each of said stepper motors being provided with a frequency damper.

8. An apparatus according to claim 1 wherein said machining means comprises a machine head having stepper motors, said stepper motors being provided with means for damping vibration.

9. An apparatus according to claim 1 wherein said input pattern includes mounting posts, and wherein said machining means includes a tubularly shaped tool for transferring the patterns of the mounting post to the workpiece.

10. An apparatus for machining a workpiece comprising:
    a machine tool having a work surface and a machine head actable on said work surface, said machine head being movable in accordance with an input signal;
    mounting means for accepting the workpiece, said mounting means being mountable on said work surface; and
    processing means for producing the input signal in accordance with a desired sequence of movements, wherein said processing means includes input means for inputting a pattern and for deriving the desired sequence of movements from the pattern, and
    wherein said processing means further includes means for compensating for machine head geometry by leaving more material on the workpiece than that called for by the pattern.

11. An apparatus according to claim 10 wherein said mounting means comprises a plate with an adhesive layer to which the workpiece is adhered.

12. An apparatus according to claim 10 wherein said work surface includes alignment means for positioning both the workpiece and said mounting means at a predetermined position on the work surface.

13. An apparatus according to claim 10 wherein said work surface includes a pin hole vacuum plate for holding the mounting means uniformly on the work surface.

14. An apparatus according to claim 10 wherein said machine head is capable of three axis movement.

15. An apparatus according to claim 14 wherein the three axes are arranged so that the work surface does not support them.

16. An apparatus according to claim 14 further comprising plural stepper motors associated with each of said axes for moving the machine head.

17. An apparatus according to claim 16 wherein said stepper motors are operated in an open loop mode, each of said stepper motors being provided with a frequency damper.

18. An apparatus according to claim 10 wherein the desired sequence of movements includes design portions and cut-out portions, and said machine head is controlled so as to cut the cut-out portions into the workpiece and so as to transfer the design portions to the workpiece.

19. An apparatus according to claim 10 wherein said input means is adapted for inputting a design and an outline for the article of jewelry, and said processing means differentiates between the design and the outline of the article of jewelry and causes said machining means to transfer the design to the workpiece and to cut the outline into the workpiece, thereby to form the article of jewelry.

20. An apparatus according to claim 10 wherein said desired sequence of movements includes a movement for producing a mounting post, and wherein said machine head is adapted to receive a tubularly shaped tool for forming the mounting post.

* * * * *